UNITED STATES PATENT OFFICE.

EDUARD RITSERT, OF FRANKFORT-ON-THE-MAIN, GERMANY.

AROMATIC ESTERS AND PROCESS OF MAKING SAME.

SPECIFICATION forming part of Letters Patent No. 748,101, dated December 29, 1903.

Application filed April 20, 1903. Serial No. 153,551. (Specimens.)

*To all whom it may concern:*

Be it known that I, EDUARD RITSERT, a subject of the German Emperor, residing and having my post-office address at 75 Gutleutstrasse, Frankfort-on-the-Main, Germany, have invented certain new and useful Improvements in Aromatic Esters, of which the following is a specification.

The ethers of certain aromatic amidocarbonic acids have lately been much used as effective anesthetics, yet their general application has been limited to a certain degree by the circumstance that these ethers are insoluble in water, while the soluble salts of them hitherto described have proved strongly irritating. My invention is based on the discovery that these ethers yield well-defined compounds with the aromatic sulfonic acids, which are sufficiently soluble in cold water and at the same time may be applied without an injurious effect.

In carrying out my invention the aromatic amidocarbonic-acid ethers are either directly combined with the free sulfonic acids or the salts of both are brought to react mutually. The new compounds can either be isolated in dry state or the resulting solution can be used as such. These different methods are illustrated by the following examples:

I. *Paraämidobenzoic acid-ethylether+metabenzenedisulfonic acid.*—One hundred and eighty-five grams of paraämidobenzoic acid-ethylether are dissolved in a hot solution of metabenzenedisulfonic acid containing one hundred and nineteen grams of the acid in about seven hundred and fifty cubic centimeters. On cooling the surplus of the ether separates out. The filtered liquor is then boiled again and having been sufficiently concentrated yields white prismatic crystals, the analysis of which agrees with the formula:

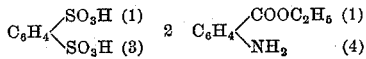

The compound is easily soluble in water and alcohol, not soluble in ether. Heated in the melting-tube it decomposes at about 235° centigrade.

II. *Paraämidobenzoic acid-ethylether+orthophenol-sulfonic acid.*—If a solution of two hundred grams of the hydrochlorid of paraämidobenzoic acid-ethylether in one thousand cubic centimeters of water be added to a hot aqueous solution of two hundred and fifteen grams of the sodium salt of orthophenol-sulfonic acid in two thousand cubic centimeters, white needles separate out on cooling, which melt at 188° to 191° centigrade. By recrystallizing the melting-point is raised to 201° to 203°. The orthophenol sulfonic acid salt of the paraämidobenzoic acid ethylether

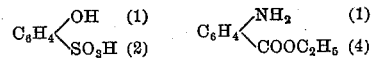

is soluble in cold water, easily soluble in hot water or alcohol.

III. *Metaämidoparaoxybenzoic acid-methylether+paraphenol-sulfonic acid.*—This compound is obtained by dissolving one hundred and fifty grams of metaämidoparaoxybenzoic acid-methylether in a hot solution of one hundred and seventy-five grams of paraphenol-sulfonic acid in seven hundred and fifty cubic centimeters of water:

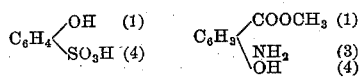

white needles which melt at 219° to 221°.

IV. *Paraämidobenzoic acid-ethylether+ anisol-sulfonic acid.*—Anisol is heated with the equivalent weight of sulfuric acid for two hours on the water-bath, and the mixture resulting is diluted with about the same quantity of water. Paraämidobenzoic acid-ethylether (one molecule) is then added to the hot solution. On cooling glittering needles are obtained, melting at 188° centigrade, which are slightly soluble in cold, easily soluble in hot water.

V. *Aqueous solution of the phenol-sulfonic-acid salt of paraämidobenzoic acid-ethylether.*—The mixture of ortho and para phenol sulfonic acid resulting by treating carbolic acid with cold sulfuric acid is liberated from unchanged carbolic and sulfuric acid by isolating the dry sulfonic-acid lead or baryta salts, redissolving the same and exactly precipitating the metal by sulfureted hydrogen in the one or by sulfuric acid in the other case. The aqueous solution of the free phenol-sulfonic acids thus obtained is then titrated with standard soda solution and diluted till containing about two per cent. of acid.

The cold solution is saturated with paraämidobenzoic acid ethylether, and the surplus of the latter having been filtered off is ready for use.

If instead of the free compounds their salts are to be applied, it is best to combine the sodium salt of the sulfonic acid with the hydrochlorid of the aromatic base, the chlorid of sodium thus formed as the only secondary product of the reaction being in no way an obstacle to the direct application of the solution.

If, for instance, one hundred and ninety-six parts of weight of the sodium salt of orthophenol-sulfonic acid and 203.5 parts of weight of the hydrochlorid of metaämidoparaoxybenzoic acid methylether are dissolved each in five liters of water on mixing results a solution containing about 1.5 per cent. of the orthoform now ready for use.

The compounds produced as described are white crystals, soluble in cold water and alcohol, not soluble in ether, and can be employed in the medical art as anesthetics without injurious effect.

The same compounds are obtained by the action of the salts of the two components, for instance, by allowing the hydrochlorid of para-amido-benzoic acid ethylether to act on the sodium, potassium, barium, or like salts of sulfocarbonic acids.

I claim—

1. The herein-described process of the manufacture of soluble anesthetics which consists in causing aromatic sulfonic acids to act upon aromatic amidocarbonic-acid ethers substantially as and for the purpose set forth.

2. As an article of manufacture the herein-described compounds which can be obtained by causing aromatic sulfonic acids to act upon aromatic amidocarbonic-acid ethers and which are white crystals soluble in cold water and alcohol, not soluble in ether and which may be used in the medical art as anesthetics without injurious effect substantially as described.

In testimony whereof I have signed my name to this specification in the presence of two subscribing witnesses.

EDUARD RITSERT.

Witnesses:
MICHAEL VOLK,
ERWIN DIPPEL.